(12) United States Patent
Dean et al.

(10) Patent No.: US 9,081,171 B2
(45) Date of Patent: Jul. 14, 2015

(54) SPECTRUM-MODULATED SMART WINDOWS

(75) Inventors: Kenneth A. Dean, Phoenix, AZ (US); John David Rudolph, Cincinnati, OH (US); Jason Charles Heikenfeld, Cincinnati, OH (US)

(73) Assignee: University Of Cincinnati, Cincinnati, OH (US)

( * ) Notice: Subject to any disclaimer, the term of this patent is extended or adjusted under 35 U.S.C. 154(b) by 106 days.

(21) Appl. No.: 13/638,978

(22) PCT Filed: Apr. 4, 2011

(86) PCT No.: PCT/US2011/000595
§ 371 (c)(1),
(2), (4) Date: Oct. 23, 2012

(87) PCT Pub. No.: WO2011/012554
PCT Pub. Date: Oct. 13, 2011

(65) Prior Publication Data
US 2013/0128336 A1    May 23, 2013

Related U.S. Application Data

(60) Provisional application No. 61/341,828, filed on Apr. 5, 2010.

(51) Int. Cl.
| | | |
|---|---|---|
| G02B 1/06 | (2006.01) |
| G02B 3/12 | (2006.01) |
| G02B 26/00 | (2006.01) |
| E06B 9/24 | (2006.01) |
| G02B 26/02 | (2006.01) |

(52) U.S. Cl.
CPC . *G02B 26/00* (2013.01); *E06B 9/24* (2013.01); *G02B 26/004* (2013.01); *G02B 26/005* (2013.01); *G02B 26/02* (2013.01); *E06B 2009/2464* (2013.01)

(58) Field of Classification Search
CPC ....... G02B 3/14; G02B 26/004; G02B 26/005
USPC .................................................. 359/665, 666
See application file for complete search history.

(56) References Cited

U.S. PATENT DOCUMENTS

| | | |
|---|---|---|
| 3,389,296 A | 6/1968 | Carruth |
| 3,775,353 A | 11/1973 | Kohne, Jr. et al. |
| 2005/0136243 A1 | 6/2005 | Fisher |
| 2006/0274218 A1* | 12/2006 | Xue .................................. 349/16 |
| 2009/0002822 A1 | 1/2009 | Tonar et al. |
| 2009/0225400 A1 | 9/2009 | Ansems et al. |
| 2009/0296188 A1 | 12/2009 | Jain et al. |

FOREIGN PATENT DOCUMENTS

| | | |
|---|---|---|
| WO | WO 2009/036272 A1 | 3/2009 |
| WO | PCT/US1/00595 | 7/2011 |
| WO | WO 2011/126554 A1 | 10/2011 |
| WO | PCT/US11/00595 | 3/2012 |

* cited by examiner

*Primary Examiner* — William Choi
(74) *Attorney, Agent, or Firm* — Wood, Herron & Evans, LLP

(57) ABSTRACT

Methods, systems, devices and/or apparatuses are provided that selectively reflect the infrared spectrum independent of other regions of the solar spectrum in order to actively manage solar heat gain across surfaces such as windows, skylights, roofs, siding and the like.

14 Claims, 6 Drawing Sheets

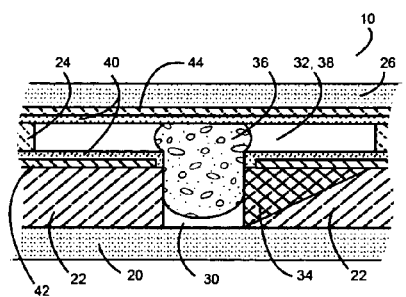
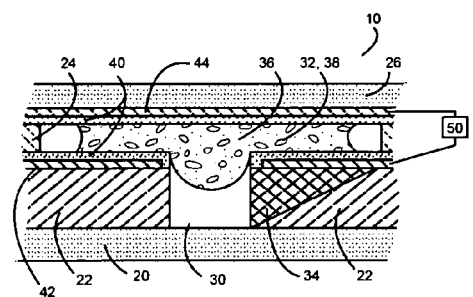
FIG. 1a  FIG. 1b
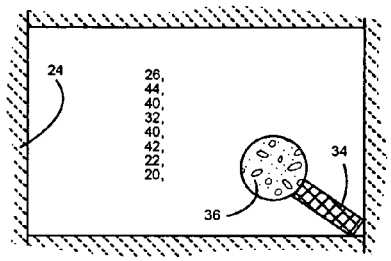
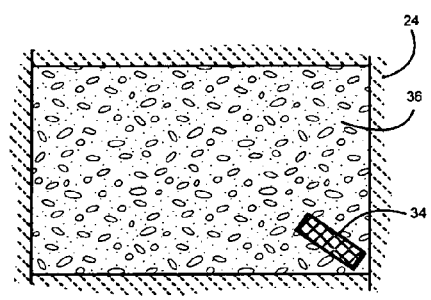
FIG. 1c  FIG. 1d

SPECTRUM-MODULATED SMART WINDOWS

CROSS-REFERENCE TO RELATED APPLICATIONS

This application is a national stage application of Patent Cooperation Treaty Application Serial No. PCT/US2011/000595, filed Apr. 4, 2011, which claimed priority to U.S. Provisional Patent Application Ser. No. 61/341,828, filed Apr. 5, 2010, the disclosures of each of which is incorporated herein by reference.

BACKGROUND

The present disclosure relates to smart windows, also called dynamic glazing, and the use of electrofluidic devices to change the transmission of the solar spectrum through a window, transparent surface and/or translucent surface.

Electrowetting has been a highly attractive modulation scheme for a variety of optical applications. For example, electrowetting has been used to provide optical switches for fiber optics, optical shutters or filters for cameras and guidance systems, optical pickup devices, optical waveguide materials and video display pixels.

Conventional electrowetting displays include colored oil that forms a film layer against an electrically insulating fluoropolymer surface. Underneath the fluoropolymer is a reflective electrode constructed from aluminum. This colored oil film layer provides coloration to the reflective surface below. When a voltage is applied between a water layer residing above the oil film layer and the electrode below the fluoropolymer, the oil film layer is broken up as the water electrowets the fluoropolymer. When the voltage is removed, the oil returns to the film layer geometry. While the oil film layer is broken up, the perceived coloration of the surface is that of the reflective electrode (e.g., white) whereas, when the oil is in the film state, the perceived coloration is that of the oil. Coloration of the oil is provided by including at least one dye. Conventional electrowetting technology may provide greater than 70% white state and a contrast ratio of up to 10:1 in the visible spectrum for the purpose of information displays.

Incident sunlight brings about 1 KW/m2 of energy to the earth's surface over the wavelength range of 300 to 2500 nm, with ~52% of that energy being in infrared wavelengths. A majority of infrared energy lies in the Infrared-A range (700-1400 nm), with nearly 50% of incident infrared energy and 25% of total solar energy lying in the 700-1000 nm range. Buildings are generally designed to maintain a constant and comfortable temperature and employ heating and cooling systems to do so. Energy efficient buildings often make use of solar radiation for both lighting needs and temperature control.

Buildings today use passive techniques to achieve the energy efficiency status quo. Windows provide lighting, and insulated walls, roofs, windows and skylights are designed to isolate the indoor climate from the outdoor climate. Passive paints have been developed to reflect infrared from buildings. These contain infrared-reflecting pigments, or infrared-transparent pigments combined with visible-region pigments on an infrared-reflecting substrate. In addition, some buildings employ designs that restrict the high summer sun from entering southern exposure windows, but allow lower winter sunlight to come through them, providing some seasonal adaptability. While some structures take advantage of these designs, new track home developments, for example, place the same several floor plans on each lot regardless of sun orientation. Consequently, while efficient passive components are available, efficient design and implementation is not necessarily reaching the bulk of the population. Federal Energy Star guidelines have attempted to set performance levels in order to drive improved efficiency.

Several technology-based solutions for manipulating solar heat gain and minimizing thermal heat transfer have been successfully deployed in recent decades. For example, low emissivity coatings applied to the inside surface(s) of dual pane windows restrict thermal transfer across the insulating gas gap. In cool climates, windows have this film on the inside gas gap to keep in heat. In hot climates, this coating lies of the outside glass sheet to keep the heat on the outside. In addition to these coatings, window glass and window films are utilized to reflect or absorb solar heat gain prior to that energy entering the building, but only for those climates where excessive heat is the dominant issue. In addition to these passive window coatings, infrared-reflective pigments have been developed for applications such as greenhouses and roof tiles. These pigments have been tailored to reflect infrared while impacting the desirable aspects visible spectrum as little as possible. They are sometimes used on roofs in sunny climates and siding on southern exposures.

A key weakness of passive techniques for controlling solar heat gain is that a one-sized solution does not fit all. In many climates, solar heat gain should be maximized in the winter, but minimized in the summer. In dry climates where the temperature varies by 30 degrees each day, the solar heat gain should be maximized in the 45° F. morning and minimized in the 75° F. afternoon.

Federal Energy Star guidelines set performance requirements for windows in different climate zones within the United States that can generally only be achieved with dual pane window designs and passive windows coatings that reduce transmission of visible and infrared light. Energy Star divides the United States into four regions. Windows built for Napa Valley have the same coating requirements as those built for El Paso and Atlanta, even though the climates are remarkably different. Wherever we can better match the diurnal, seasonal, and regional solar heat gain to a building's needs, we improve our energy efficiency.

Active solutions promise further improvements. Clearly, some active solutions have been in place for time eternal, like closing curtains and blinds on hot days to keep out heat and on winter nights to keep in heat. For example, Phoenix residents may put up attenuating sun screens in the summer, while Boston residents may tape plastic over windows in the winter. Some have employed sun-tracking reflective solar curtains. Others have installed existing smart window technologies, existing smart window technology. However some of this technology has disadvantages that have prevented widespread adoption.

There are generally three main types of smart window technology, polymer-dispersed liquid crystal, electrochromic, and suspended particle. Polymer-dispersed liquid crystal is generally comprised of spheres of encapsulated liquid crystal. Without power, the liquid crystal molecules are randomly organized and scatter light, created a translucent (or privacy) surface. With voltage, the liquid crystal molecules align themselves to the direction of window transmission, allowing light to pass through without scattering. Polymer-dispersed liquid crystal is not hardy enough for sun-facing applications due to the UV-instability of liquid crystal material, and is used primarily for interior privacy applications. Suspended particle windows contain elongated light absorbing micro-crystals between two transparent sheets. With no power, these crystals are randomly-aligned and absorb all the incident light. With a voltage applied between the two transparent sheets, the elongated crystals line up perpendicular to the sheet surface, allowing about 50% of light to pass through. Suspended particle windows are dark with no applied power, and hence become dark during power failure. This restricts their application making them unsuitable for windshields in autos, boats, planes and buses, and for some architectural applications. These types of windows are also heavily tinted in the 'clear' state. Electrochromic windows contain a chemical gel and a metal oxide that is transparent. Application of voltage causes a chemical reaction in the gel that removes oxygen from the oxide causing it to absorb light. Electrochromic windows switch from clear to dark very slowly (minutes) and are difficult to implement on curved surfaces. While these technologies may have uses, neither suspended particle nor electrochromic technologies shade visible light while transmitting infrared, which is generally desirable for the northern climate zone. Further, neither electrochromic nor suspended particle can modulate the reflection of infrared wavelengths, which is desirable for southern climates.

Other optical shutter technologies used in displays are incompatible with infrared modulation as well. For example, electrophoretic modules often incorporate titania as an optically white material. Titania is also an infrared reflector, so electrophoretic modules reflect infrared at the same time that they reflect visible light. However, electrophoretic modules such as E-Ink are not transparent and cannot be used as windows. Finally, cholesteric liquid crystal modules have been demonstrated which reflect some infrared light over a fairly narrow range, and contain multiple layers to independently reflect various colors. However, the extreme UV sensitivity of these materials, combined with the narrow reflectivity ranges of each layer, make these intractable for exterior-facing window applications.

Another optical shutter technology that is incompatible with selectable infrared reflection or selectable infrared transmission with visible attenuation is electrowetting. Conventional electrowetting moves a dyed oil across a surface in the presence of a polar fluid, in order to modulate transmission. In the case of infrared reflection, dyes absorb, rather than reflect, so reflection by the fluid is not possible. Moreover, the particles that are needed to scatter or reflect light are generally incompatible with the oil (or non-polar) phase because dispersing these particles leads to electrophoretic or conductive properties of the fluid that is supposed to be non-polar and insulating. These particles and dispersants spoil the electrowetting property. In the case of infrared transmission, but visible absorption, dyes exist which are black but infrared transmissive. However, dyes degrade in the Sun orders of magnitude faster than pigments, and are simply not suitable for the application. Thus, conventional electrowetting technology using dyes cannot meet the requirements for windows.

What is lacking is an inexpensive technology to actively manage the total solar spectrum (e.g., near infrared and visible) through windows by day, season and region. Moreover, it may be desirable to independently manage the infrared and visible regions, because consumers often want visible light without the infrared heat or infrared heat without the visible light.

SUMMARY

The disclosure provides methods, systems, devices and/or apparatuses related to reflecting and/or allowing transmission of infrared region of the solar spectrum. Specifically, the disclosed methods, systems, devices and/or apparatuses relate to selectively reflecting the infrared spectrum independent of other regions of the solar spectrum.

Specifically, the disclosure provides a technology for active management of solar heat gain across surfaces. More specifically, surfaces are provided which modulate near-infrared reflection, transmission, and/or absorption properties, in some embodiments in response to the heating and cooling needs of a building while providing visible light when required. These active surfaces may be applied to windows, skylights, roofs, siding and the like. In some embodiments, "smart" surfaces may be tied directly into building HVAC systems and/or they may operate autonomously through solar power and a sensor/algorithm system.

BRIEF DESCRIPTION OF THE DRAWINGS

The foregoing and other features of the present disclosure will become more fully apparent from the following description and appended potential points of novelty, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings wherein:

FIG. 1a comprises a side cross-sectional view of an optically-modulating layer in an example embodiment of the present invention;

FIG. 1b comprises a side cross-sectional view of an optically-modulating layer in an example embodiment of the present invention;

FIG. 1c comprises a top plan view of the optically modulating layer depicted in FIG. 1a;

FIG. 1d comprises a top plan view of the optically modulating layer depicted in FIG. 1b;

FIG. 2b comprises a top plan view of the optically-modulating layer depicted in FIG. 2a;

FIG. 3b comprises a top plan view of the optically modulating layer depicted in FIG. 3a;

DETAILED DESCRIPTION

Figure 2A:
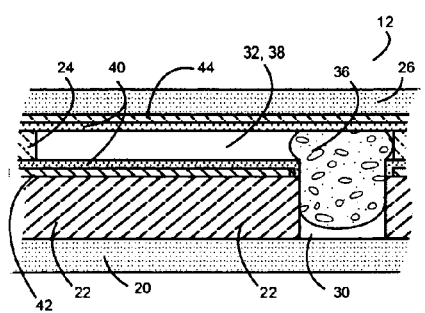
FIG. 2a comprises a side cross-sectional view of an optically-modulating layer in another example embodiment of the present invention.
Figure 2B:
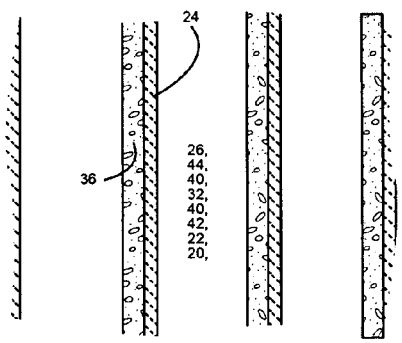
Figure 3A:
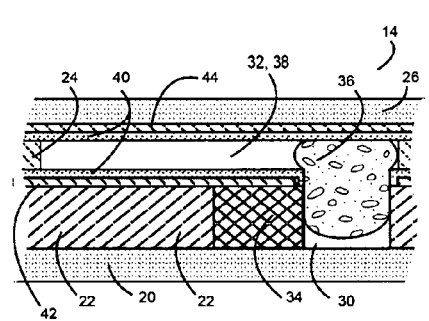
FIG. 3a comprises a side cross-sectional view of an optically modulating layer in yet another example embodiment of the present invention.
Figure 3B:
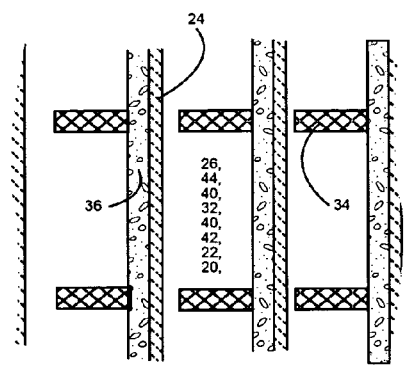

In the following detailed description, reference is made to the accompanying drawings, which form a part hereof. In the drawings, similar symbols typically identify similar components, unless context dictates otherwise. The illustrative embodiments described in the detailed description, drawings, and potential points of novelty are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

An electromechanical force on a conductive polar fluid that is adjacent to an electrically insulated electrode underlies the physical mechanism for at least one embodiment of the present invention. This electromechanical force originates near a line of contact between the conductive polar fluid and a dielectric that insulates the electrode. The electromechanical force is proportional to electrical capacitance times the square of the bias potential, or applied voltage. The electromechanical force is generally oriented such that it is directed outward from an exposed surface of the polar fluid. When the polar fluid is confined within a cavity or channel, this electromechanical force can also be interpreted as a force per unit area or a pressure. This arrangement provides high-speed operation (on the order of milliseconds), low power capacitive operation (about 10 mJ/m$^2$), and excellent reversibility.

A Cartesian coordinate system will be used to define specific directions and orientations. References to terms such as 'above,' 'upper,' 'below,' and 'lower' are for convenience of description only and represent only one possible frame of reference for describing a particular embodiment. The dimensions of the devices described herein cover a wide range of sizes from nanometers-to-meters based on the application. Terms such as visible will be used in some cases to describe a person or machine vision system or other optical source or detector that is facing towards an upper surface of the embodiments described herein. Several of the diagrams will contain a 'side view' and a 'top view', the 'top view' being the direction normal to a substrate surface, usually a viewable surface of the substrate, and in some cases in the direction of the viewer or observer of the device. These top view diagrams can be partial device cross-sections in order to show the arrangement of only a particular sub-set of features and should not always be considered as the actual top view appearance of the device features.

The term fluid is used herein to describe any material or combination of materials that is neither solid nor plasma in its physical state. A gas may also be considered as a fluid so long as the gas moves freely according to the principles of the present invention. Solid materials, such as fluid powders, can also be considered a fluid if the solid materials move freely according to the principles of the present invention. The term fluid is not confining to any particular composition, viscosity, or surface tension. Fluids may also contain any weight percent of a solid material so long as that solid material is stably dispersed in the fluid. Fluids may also contain mixtures of multiple fluids, dispersants, resins, biocides, and other additives used in commercial fluids with demanding optical, temperature, electrical, fouling, or other performance specifications.

Examples of polar fluids include water, propylene glycol, and ethylene glycol. Examples of non-polar fluids include alkenes and silicone oils. Examples of gases include argon, carbon dioxide, and nitrogen. If more than one fluid is used that contains distinct solid particles or dissolved constituents, then it is preferred that the fluid be polar if particles or constituents are to be kept separated.

Pigments and dyes in many cases are solid particles that can be dispersed or dissolved in fluids to alter at least one optical or spectral property of the fluid.

Spacers can be made of solid materials that are similar to the solid materials used in constructing the substrates. In some cases, the spacers can be part of the substrate itself, such spacers being formed by etching, laser processing, microreplication, or other technique. Spacers can also be formed from optically curable epoxies or photoresists, such as MICROCHEM SU-8 or DUPONT Per-MX.

Dielectrics can include any solid material which provides suitable electrical insulation and, for example, can be inorganic such as silicon nitride (SiN), organic such as Parylene C, or fluorinated such as Parylene F, mixtures thereof, layers thereof, and combinations thereof. Dielectrics thicknesses can range from 10's nm to 10's μm resulting in operating voltages between 1 V and 120 V, respectively. Solid surfaces or films may be inherently hydrophobic, or provided with an order of hydrophobicity by addition of a film or coating, by plasma treatment, by molecular mono-layer treatment, or other means. Fluoropolymers such as CYTONIX Fluoropel and ASAHI Cytop provide exemplary hydrophobicity. Additional solid materials, which are not hydrophobic to the polar fluid such as water in a gas, may still be hydrophobic if the gas is replaced with a non-polar fluid that has surface tension that is similar to the solid material.

Generally, the term hydrophobic is used herein to describe a Young's wetting angle of >90°, and the term hydrophilic is used herein to describe a Young's wetting angle of <90°. However, hydrophobic or hydrophilic functionality may extend beyond these limits in certain devices or material configurations. Super hydrophobic coatings are those exhibiting a large Young's angle for a polar liquid in a gas and are achieved by geometrically texturing a surface.

Voltage sources can be direct voltage sources from a power source, locally generated voltage, or current sources. Numerous direct, alternating, or other types of voltage sources known to those skilled in the art of displays or microfluidics are applicable. Voltage sources may be biased by 0V, a positive DC voltage, a negative DC voltage, or AC voltage or other as appropriate.

Reflector materials may include metal films, layers with different refractive indices including multilayer dielectrics, particle filled polymers or fluids where the particles differ in refractive index from the polymer or fluid, one- or multi-dimensional photonic crystals, or other reflectors that are known by those skilled in the art of optics and displays.

Scattering mediums include polymers or fluids having particles disperse therein and where the particles differ in refractive index from the polymer or fluid, structured polymers or metals, microreplicated optics, or other scattering features that are know by those skilled in the art of optics and displays.

The term channel or hydrophobic channel will be used to describe physical confinement of a fluid that is horizontally larger than it is vertical in dimension, and which in some embodiments of the present invention will provide a means to visibly display a fluid. The channel is generally defined or bounded by one or more walls, typically of a fabricated patterned substrate.

The term reservoir can be any feature formed as part of a device, or is external to the device, including any feature that can store or hold a fluid until it is ready to be moved inside, or into, a device. Reservoirs may also be simple inlet/outlet ports or vias that may or may not be connected to additional devices, chambers, or channels.

The term duct will be used to describe a feature which provides a pathway for fluid flow and, like the reservoir, can be integrated inside of device, or in some cases could be external to the device as well.

Fluids may be dosed into devices of the present invention using one of several methods. The polar fluid can be emulsed with the non-polar fluid and then physically, chemically, or optically separated from one another after the device is completed. The polar fluid can be vacuum dosed into the reservoir, non-polar fluid added, and the device sealed. The non-polar fluid can be dosed into a reservoir, the polar fluid added, and the device sealed. The polar fluid can be electrowetted into an area by application of voltage between the polar fluid and an electrode. Numerous alternatives and combinations of dosing combinations are included within the spirit of the present invention.

For windows and skylights, management of both the infrared and visible spectrums may be important. For example, during the winter it may be desirable to have both light and heat, but during the summer, light may be required without heat. In addition, exemplary infrared-managing surfaces for windows may be visually transparent, preserving the optical clarity of the window in both the infrared-transparent and infrared-reflecting states.

In an example embodiment, a transparent surface or translucent surface such as a window or skylight may modulate the solar heat gain of the infrared spectrum and the visible spectrum electronically to improve the efficiency of controlling local (e.g. indoor) climates. Modulation may be accomplished by changing the contact angle of a fluid on a hydrophobic surface by means of applying a voltage (often called electrowetting). Using an electrofluidic device structure (such as structures described in U.S. patent application Ser. No. 12/677,653), different types of pigments may be dispersed within the fluid, including a) infrared-reflecting pigments, b) visible-wavelength absorbing pigments and/or c) infrared-transmitting, visible-wavelength absorbing pigments. Such pigments may then be modulated electronically, changing cross-sectional area they occupy on the surface in the same manner that a squid's chromatophores change a squid's skin color. In this manner, a single device layer may control infrared transmission and reflection independent of visible transmission, or concurrent with visible transmission. In some embodiments, non-pigment techniques may modulate infrared reflection by filling an infrared photonic crystal with fluid. The electrofluidic device structure may be fabricated with simple manufacturing techniques, providing a cost-effective solution. Moreover, the fluids and dispersions may be environmentally stable (e.g., no dyes) and/or environmentally friendly (e.g., no toxic chemicals). Some embodiments may utilize the similar pigments found in architectural materials, providing improved resistance to long-term solar degradation.

An electrofluidic layer is comprised of a reservoir which stores a pigmented fluid, a surface channel into which the fluid moves in response to an applied stimulus (voltage, for example), and a stack which includes a dielectric layer, and a hydrophobic layer. In a typical example, transparent conductors are positioned adjacent to the dielectric layer and on sides opposed to the fluid channel. Electrical bias applied to the electrode layer causes the pigmented fluid to occupy the channel area.

In some embodiments, a window (such as a dual pane window) may include an inner sheet of glass, an outer sheet of glass, a frame which holds the glass together, and a filling gas. The inner surface of the inner sheet of glass may be on the inside on a structure or building. The outer surface of the outer sheet of glass may be on the outside of the structure or building. Some of the glass surfaces may be coated with low emissivity films, infrared reflecting films and/or UV absorbing, reflecting or attenuating films.

In some embodiments, such as that illustrated in FIG. 1, an electrofluidic module (10) may be formed on one of the sheets of glass. In some examples, this may be on the inside surface of the outer sheet of glass. The electrofluidic module may be laminated to the glass sheet, formed on the glass sheet itself and/or otherwise coupled to the glass sheet. In some embodiments, the electrofluidic module may contain a device layer, comprised of a first substrate (20) and a second substrate (26). A first spacer (22), or mesa, may be formed on the substrate (20), containing reservoirs within the first spacer structure (30), and a second spacer structure (24) surrounding the wells, which define a cell.

Alternatively, the first substrate may be a polymeric material that has been formed with three-dimensional surface features containing a first spacer, reservoirs within the first spacer and/or spacer structures surrounding the reservoir. A transparent conductor (42) forming a first electrode may be disposed onto the mesa and within the reservoirs. Conductors with suitable transparency (e.g., >90% and preferably >95%) with concurrent resistivity < 10,000 ohms/square and more preferably < 2000 ohms/square are readily available and may include indium tin oxide, tin oxide, or Poly(3,4-ethylenedioxythiophene) poly(styrenesulfonate) (PEDOT:PSS), carbon nanotube network films and the like. The transparent conductor may be predominantly absent from the sides and bottom of the reservoir.

A suitable method for preparing the transparent conductor may be deposition by sputtering or spray-coating and patterning via photolithography and/or etching. A dielectric film (40) or multiple film stack comprising alumina, $SiO_2$, SiON, alumina or parylene may be disposed on top of the transparent conductor layer. This dielectric may have a high breakdown strength and a low defect density so that it may be as thin as possible (e.g., preferably less than 2 micrometers, and more preferably less than 0.5 micrometers) so that the drive voltage for the device is low. A top surface or top layer of of the dielectric stack (40) preferably includes a hydrophobic fluoropolymer (not shown). A polar fluid (36) may be disposed within the well above the fluoropolymer/dielectric/transparent conductor stack. A non-polar fluid (38) such as an alkane or silicone may be disposed on top of the mesa and the polar fluid. A second substrate (26), containing a stack-up of transparent conductor (44) as the $2^{nd}$ electrode, a dielectric and hydrophobic fluoropolymer layer (40), may be disposed on top of the second spacers (24) with the fluoropolymer layer in contact with the non-polar fluid and spacers. The gap between the second substrate and the mesa of the first substrate defines a surface channel (32).

Preferably the device (10) includes a duct (34) or other fluid pathway to break the symmetry of the polar fluid 36 and to allow efficient recirculation of the polar fluid 36 and non-polar fluid (38). Example device structures that may be used to modulate pigments can be found in Society for *Information Display Digest* 2010 41, 484 (2010) and *Nature Photonics* 3, 292-296 (2009).

The device (10) may be modulated as follows: with no applied voltage, a net Young-Laplace pressure ($\Delta p = 2\gamma/R$) causes a ~10-20 wt. % pigment dispersion to occupy the cavity that imparts a larger radius of curvature on the pigment dispersion. Therefore, at equilibrium, the pigment dispersion may occupy the well reservoir and may be largely hidden from view. This is analogous to connecting two soap bubbles by a straw; the larger bubble has a larger radius of curvature, a lower Young-Laplace Pressure, and will therefore consume the smaller bubble. Next, a voltage may be applied between the two electrowetting plates and the pigment dispersion. This induces an electromechanical pressure that exceeds the net Young-Laplace pressure and the pigment dispersion is pulled into the surface channel. A very simple formula for calculating net pressure was derived by Heikenfeld et al.:

$$\Delta p \approx \frac{2\gamma_{ao}}{h} - \frac{\varepsilon V^2}{hd},$$

where terms include the interfacial surface tension between the aqueous pigment dispersion and the oil (γ), the channel height (h), the hydrophobic dielectric capacitance per unit area (∈/d), and the applied DC voltage or AC RMS voltage (V). If the voltage is removed, the pigment dispersion rapidly recoils into the reservoir. The Young-Laplace and electromechanical pressures exceed 1 kN/m2 and may be as great as 10's kN/m$^2$. The device functions as a capacitor, with very little current flow. Consequently, the power required to hold the liquid in the cell is small, and may be obtained from solar cells. If the volume of the pigment dispersion is slightly greater than the volume of the surface channel, then the pigment will be simultaneously viewable in both the reservoir and the surface channel, and nearly the entire device area will exhibit the optical properties of the pigment. Thus, a switchable device is created that can hide and/or reveal the pigment.

In the simplest electrical embodiment, the channel may be operated as two series capacitors wherein the bottom electrode conductor/dielectric stack, pigmented fluid is one capacitor, and the top electrode/dielectric stack/pigmented fluid is the other capacitor. This scheme provides two electrical inputs (50), one for each plate, similar to PDLC, suspended particle, and electrochromic windows. In another embodiment, a reservoir electrode makes direct electrical connection to the polar fluid, forming two capacitors in parallel, thereby halving the driving voltage. This configuration also provides the option for applying different voltages on the top channel electrode and bottom channel electrode, which can reduce switching voltages and enhance grayscale states.

The cells may be modulated through a 'grayscale' range of states by scaling an analog driving voltage. There are other methods for controlling the grayscale range including placing structures into the channel which impede the progress of the pigment-containing fluid at a given voltage, or change the contact angle of the liquid. These include post structure, or changes in the channel geometry, slope and the like. For example, the fluid channel may be comprised of regions of decreasing channel height in the direction away from the pigment reservoir. As the pigment moves, it requires progressively higher voltage to move into the narrower channel region, thus providing voltage control of the percentage of the channel filled with fluid. This 3-D structuring of the channel can be formed with photolithography, less expensive microreplication, or other means. Another method of grayscaling includes changing the duty cycle of the signal (polarity-switching square waves, for example), applied between the driving electrodes. The cells may also be designed to be bi-stable, so that only an initial switching voltage is required. An example of a bistable electrofluidic structure has been described in Appl. Phys. Lett. 97, p. 143501, 2010.

Referring now to additional embodiments as depicted in FIGS. 2a, 2b, 3a, and 3b, the operating cell structure in the electrofluidic layer (12,14), previously referred to as a cell or pixel structure in analogy to display operating elements, is a linear (non-pixel) structure (12, 14). The pigment reservoir (30) consists of a trench running across the window active surface. A channel (32), with a much smaller thickness is positioned at the top of the trench forming either an "L" or a "T" configuration. During operation, the pigmented fluid (36) electrowets from the reservoir or trench (30) to the channel (32). The pigmented fluid can be stored entirely in the trench reservoir (30) and duct (34) in the "off" state, or alternately, a significant volume can be stored in a larger volume hidden from view in the side or frame of the window (outside of the region illustrated in FIG. 2). The additional volume storage on the side provides improved optical efficiency of the surface, a simpler fabrication sequence for getting the polar fluid into the device, and bistability in the form of gating electrodes that can block a volume of fluid into the trench and channels and then separate them from the rest of the ink reservoir volume. Additional layers including the first substrate (20), second substrate (26), first spacer (22), second spacer (24), dielectric including a hydrophobic surface layer (40), and transparent conductor electrodes (42, 44) have similar properties as described for the embodiment shown in FIG. 1.

Figure 4:
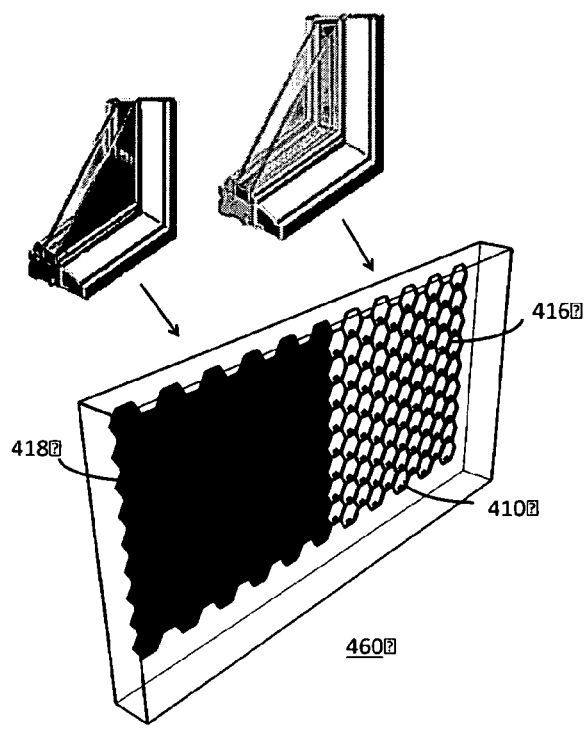
FIG. 4 is a side perspective view of a window including an electrofluidic layer in accordance with an embodiment of the present invention.

Referring now to FIG. 4, a window (460) is created from an array of cells comprised of the electrofluidic layer (embodiments of the cells are depicted in FIGS. 1,2 and 3). The window embodiment shown in FIG. 4 transmits light in the 'off' state (416), and restricts the transmission of light in the on state (418). The size of each cell (410) depends of the window specifications. Generally, a cell 300 micrometers across will not be visibly perceptible at a distance from the windows exceeding 0.3 meters. A randomization in the size and orientation of the cells may eliminate a perception of periodicity. However, larger cells may be more visibly efficient (fewer pixel borders and more transmission) and less expensive to fabricate. Cell sizes up to and exceeding 3 mm may be suitable for skylights and windows where viewers are relatively far away.

In some embodiments, the surface channel height may determine the thickness of pigment in the optical path. For strongly attenuating pigments, the surface channel height may be less than 15 micrometers. For example, 99% visible wavelength attenuation has been demonstrated with infrared transmissive pigments for channel heights between 5 and 10 micrometers and there are clear development paths for higher optical densities In some embodiments, the depth of the reservoir may be a function of the cell size and cell gap since roughly all the material in the reservoir must spread out over the mesa surface. For 300 micrometer cells, the depth may be less than 50 micrometers. Larger cells may have larger depths. The total thickness of an electrofluidic device layer (including two substrates) may be as small as 300 micrometers.

Figure 5:
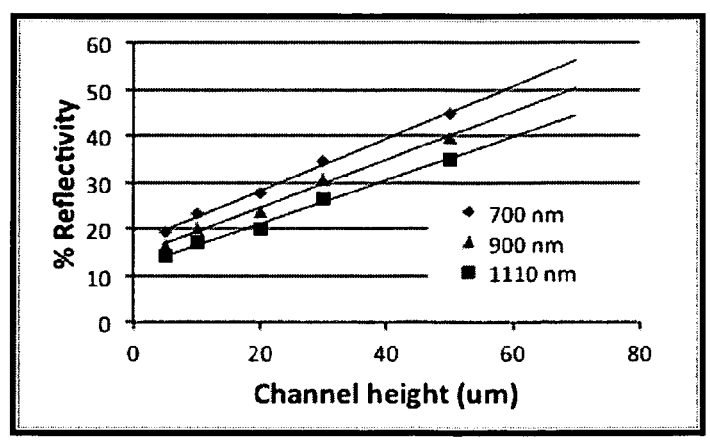
FIG. 5 is a graph depicting the influence of channel height on the infrared reflectivity of a scattering fluid.

For infrared pigments, the channel height may be larger. Numerous experiments have demonstrated that infrared reflection of pigment dispersions improves substantially with a channel height (dispersion thickness), as illustrated in FIG. 5. For many of the organic pigment systems with the best reflectivity is achieved for channel height between 50 and 100 micrometers. Larger channel height requires larger reservoir volumes, such as deeper reservoirs.

In some embodiments, the pigments may be highly resistance to ultraviolet light exposure, as are the materials in the electrofluidic device layers. In addition, the fluids may be designed to withstand and operate over a wide temperature range. Conventional fluids withstand −40° C. to 80° C. exposure.

Some infrared-reflecting pigments used in roof tiles and other applications, for example, are well-known, but very difficult to use in electrofluidic devices. First, these pigments may be dense and designed with large particle sizes (10-30 micrometers typically). The density and large particle size creates a good coating upon painting, but does not form a stable suspension for electrofluidic devices, as the pigments typically crash out. Some of the goals include: (1) the density of the pigment being similar to the density of the host fluid in order to increase pigment suspension stability over time; (2) the density of the polar and non-polar fluids preferably being similar to avoid gravity-directed separation; (3) the refractive index difference between the pigment, the polar fluid and the non-polar fluid being controlled to achieve desired scattering properties. (a high refractive index difference between the pigment and the surrounding fluid leads to better scattering); and (4) the viscosity is preferably low enough so that the fluids respond rapidly to applied potential.

In terms of making a stable suspension, typical available electrowetting polar liquids have a density close to 1 $g/cm^3$, such as water (1 $g/cm^3$), ethylene glycol (1.132 $g/cm^3$), propylene glycol (1.036 $g/cm^3$), glycerol (1.261 $g/cm^3$), propylene carbonate (1.2 $g/cm^3$) and gamma butyrolactone (1.144 $g/cm^3$). Typical pigments such as those used on infrared reflecting roof tiles and greenhouses are inorganic materials with high densities and large particle sizes. These materials are either infrared-reflecting, such as titania (4 $g/cm^3$), mica (2.83 $g/cm^3$), CI Pigment Black 30 Nickel Manganese Ferrite, CI Pigment Green 17 Iron Chromite (up to 5.2 $g/cm^3$), CI Pigment Brown 29 (5.2 $g/cm^3$), CI Pigment Brown 35 (4 to 5 $g/cm^3$) and CI pigment yellow 53 (4 to 5 $g/cm^3$), or infrared transparent (and placed over a reflecting underlying material on roofs), such as CI Pigment Blue 29 ultramarine blue (2.35 $g/cm^3$), CI Pigment Blue 28 (3.8 to 5.4 $g/cm^3$). It is challenging to make a stable infrared-reflecting dispersion with inorganic materials.

There are a number of infrared-transparent organic pigments with densities much closer to that of polar solvents that are suitable for making stable suspensions. These include perylene compounds, quinacridones, dioxazines (i.e. purple), phthalocyanines, (i.e. green and blue) among others. In addition, there are a number of scattering or white reflective organic pigments that can be used dispersed in polar solvents including melamine, polystyrene, teflon, acrylic, ethylene-bis-melamine, hollow styrene-acrylic spheres, polyimide, and high density polyethylene. Moreover, better performing infrared-reflective pigments can be formed by incorporating particles of high index, high density materials such as magnesia or titania into a matrix of low index, low density material. The index mismatch drives high infrared reflectivity, while the lower average density of the pigment forms a stable dispersion.

In some embodiments, a device (such as a window) with the appropriate pigment systems may change the infrared transmission in the solar spectrum range by 25% or more. This purposeful modulation of the infrared spectrum stands in contrast to other electro-optical technologies, which may modulate infrared a few percent along with the visible spectrum.

The following examples and comparative example illustrate particular properties and advantages of some of the embodiments. Furthermore, these are examples of reduction to practice of the present invention and confirmation that the principles described in the present disclosure are therefore valid.

EXAMPLE 1

Figure 6:
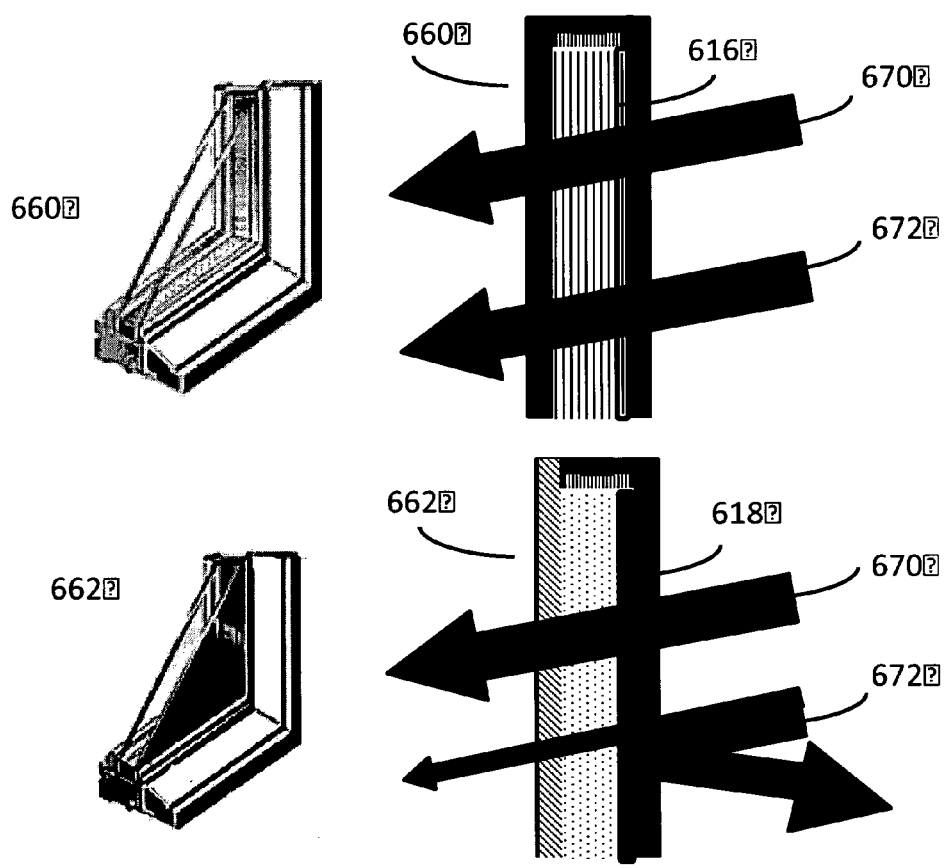
FIG. 6 includes perspective and side elevational views of the interaction of the solar spectrum with an example embodiment of the present invention, wherein the electrofluidic layer is near-infrared wavelength reflecting and visible wavelength transmitting.

A first example is a skylight that contains an electrofluidic window module formed on a curved, plastic substrate. Infrared reflecting pigment is dispersed within the fluid in the electrofluidic layer. When the building is at the desired temperature or higher, the skylight is modulated to reflect infrared. When the building is below its desired temperature, the skylight is modulated to transmit infrared. The skylight transmits approximately all the visible light that it would have in the absence of the electrofluidic window module, independent of whether the module is reflecting or transmitting infrared, although there are small light losses in the module layers. The visible light is predominantly transmitted. Consequently, the skylight helps keep the building cool in the summer, and warm in the winter. It also helps heat a building during cool mornings, while reducing cooling needs in warmer afternoons. Some infrared-reflecting pigment systems are hazy, but this is inconsequential to skylights already equipped with diffuse coatings. This same concept can be applied to windows, as depicted in FIG. 6. Near infrared (672) is reflected in the by the on-state electrofluidic layer 618 in the on-state window 662, and visible light (670) is transmitted. In the off-state window (660), both visible (670) and near infrared (672) are transmitted through the off-state electrofluidic layer (616).

The skylight may optionally have an additional device layer which attenuates the visible spectrum while transmitting infrared. An example pigment is an organic perylene-based pigment, such as BASF's Lumogen black. As depicted in FIG. 2, the skylight can then modulate both the visible spectrum and the infrared spectrum independently of each other, allowing, for example, more visible light in on cloudy days and less visible light in at high noon on warm summer nights.

The example skylight is comprised of an outer transparent shell material. An electrofluidic module has been laminated to the inner surface. The reservoirs in the electrofluidic module occupy less than 15% of the total surface area of the module. Upon application of voltage in the range of 15 to 120 V, the wetting angle of the pigment-filled fluid changes on the hydrophobic interior surfaces of the channel causing the interface angle to change from convex to concave, thereby allowing the pigmented fluid to partially leave the reservoir and occupy a majority of the module surface area. The current required to hold the state is small (e.g., microamperes/$cm^2$) so that a small solar cell occupying a small area of the window provides power for the electrofluidic module in response to interior temperature and sunlight intensity.

EXAMPLE 2

Figure 7:
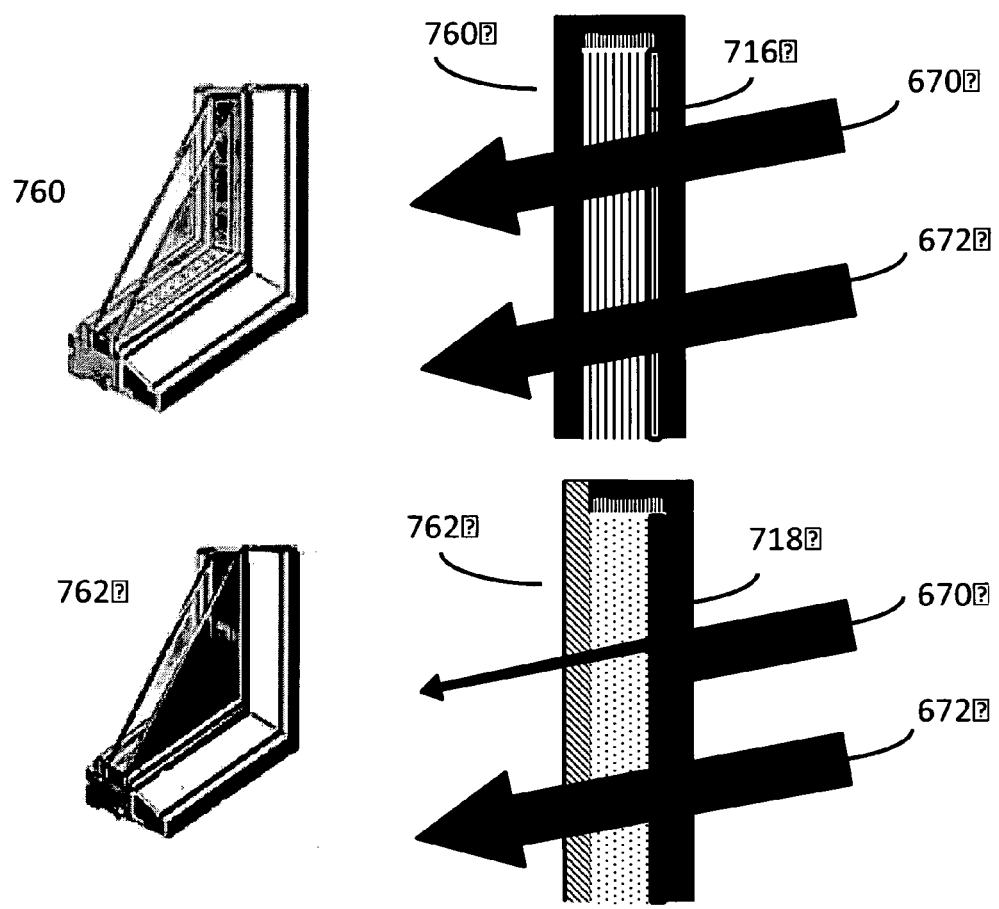
FIG. 7 includes perspective and side elevational views of the interaction of the solar spectrum with an example embodiment of the present invention, wherein the electrofluidic layer is near-infrared wavelength transmitting and visible wavelength attenuating.

A second example embodiment, depicted in FIG. 7, is a window that is well-suited for climates which are generally cold and solar heat gain is predominantly desired year round. Near infrared (672) is transmitted in the by the on-state electrofluidic layer (718) in the on-state window (762), and visible light (670) is not transmitted. In the off-state window (760), both visible (670) and near infrared (672) are transmitted through the off-state electrofluidic layer (716).

The dispersed pigment is optically absorbing, but infrared transparent in the 800 nm to 2500 nm range. The window transmits predominantly all the infrared light, meaning that it transmits greater than 50% of the possible infrared solar heat gain to 2500 nm. An example pigment is a perylene, such as is contained in BASF's Lumogen black. The window modulates this pigment to lighten or darken a room. For example, the windows at a restaurant are non-attenuating during the day, but as the sun sets and shines directly into the windows, the windows are modulated to block the light. The attenuating windows continue to provide privacy at night. A low E coating on an inside window surface retains longer wavelength IR from the building.

In this example, the electrofluidic module is formed directly on the inner surface of the outer glass sheet of a dual pane window by the deposition and patterning of several layers. During fabrication, a second glass with control electrodes is laminated to the window glass and then filled with polar and non-polar fluids. The window is tied directly into the buildings electrical system, with 120 V being applied to modulate the window.

EXAMPLE 3

Figure 8:
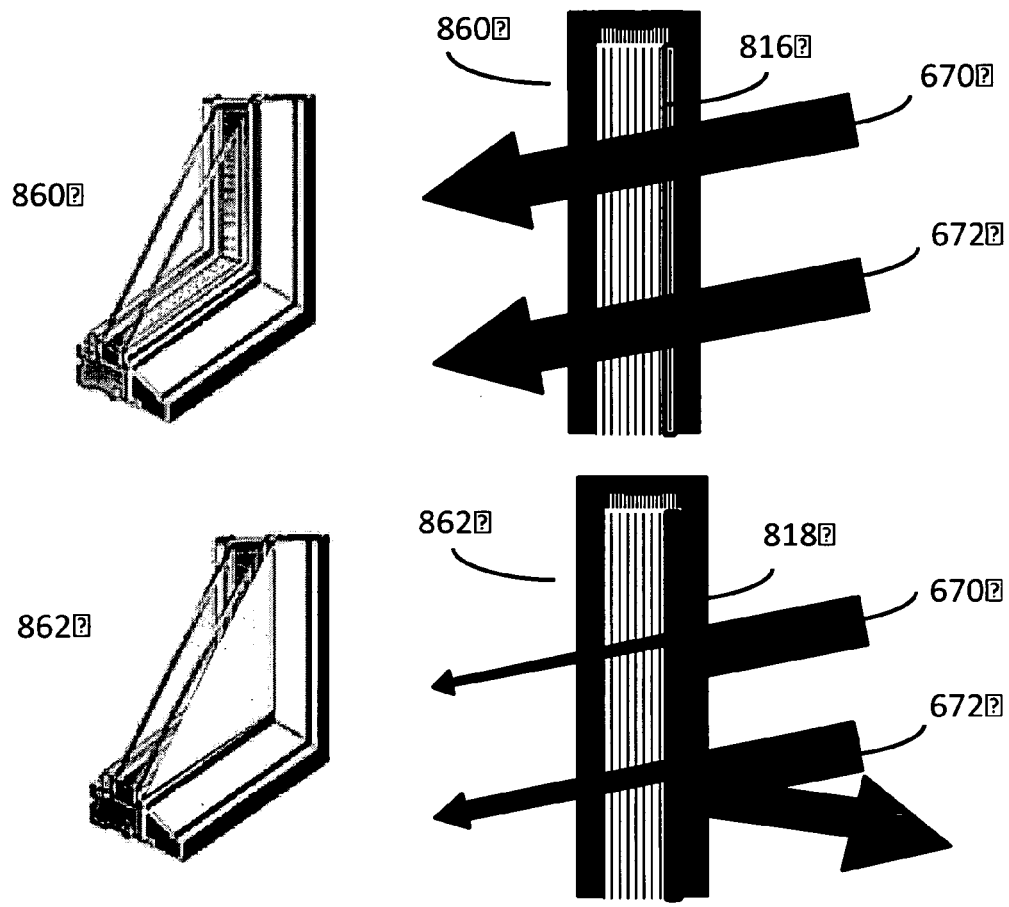
FIG. 8 includes perspective and side elevational views of the interaction of the solar spectrum with an example embodiment of the present invention, wherein the electrofluidic layer is near-infrared wavelength reflecting and visible wavelength attenuating.

The third example embodiment, depicted in FIG. 8, is a window that is well-suited for hot summer and cool winter climates. Near infrared (672) is reflected in the by the on-state electrofluidic layer (818) in the on-state window (862), and visible light (670) is not transmitted. In the off-state window (860), both visible (670) and near infrared (672) are transmitted through the off-state electrofluidic layer (816).

The fluid is loaded with: (1) a pigment system that reflects infrared; and (2) a pigment that absorbs or reflects visible light. In the summer, the windows are modulated to limit transmission of both infrared and visible light. In the winter, the windows are modulated to transmit both infrared and visible light. These windows replace the sunscreens currently ubiquitous in markets such as Phoenix, Ariz.

The design of the system solves the problem of haze sometimes encountered while using infrared pigments. Infrared pigments can scatter light in the visual range. In the 'off' state, nominally 85% of the visible light comes through the windows, while a small percentage is absorbed by the pigment well. No haze is perceived since all transmitted light comes through the window without scattering. At 50% modulation, the pigments block half of the window area. The pigments transmit no visible light. Consequently, all transmitted visible light comes through the open region of the window and is not scattered so no haze is perceived.

In these systems, a solar panel at the corner of each window generates the power necessary to darken the window (30V, 5 microamperes/$cm^2$) using control input from a photocell and the internal temperature.

EXAMPLE 4

Leaves of plants have remarkable infrared reflectivity above 750 nm, often more than 50% (Woolley 1971). This helps plant leaves control their temperature. This infrared reflectivity is not produced by pigment, dye or particle, but rather the air gaps between the cell walls of the leaves. The air gaps function like an infrared photonic crystal. In the forth example, a visibly transparent and haze-free photonic crystal is deposited in an electrofluidic module. In the presence of an index-matched fluid, infrared is transmitted through the window. When a second fluid with an appropriate index of refraction is modulated into the photonic crystal, displacing the first fluid, the surface reflects infrared.

EXAMPLE 5

An electrofluidic mixture of infrared-reflecting pigment and infrared-transmissive black pigment is prepared. This mixture has successfully been demonstrated to be both infrared-reflecting and black when introduced into a surface channel. The fluid is incorporated into a device structure where the reservoir volume is small compared to the channel area, thereby providing a haze free transmitting surface. The windows created from the fluid and the device are installed into transportation applications including automotive sun-roofs, tour bus windows, airline passenger windows, and marine (boat) windows. The infrared-reflecting property manages heat gain within the vehicle. Unlike suspended particle windows which are dark with no power, these windows can also be used on tinted front windshields, pilot windows, and boat captain windows because they can be designed to fail in the clear state.

Electrofluidic windows or "electro-optical surfaces" have several advantages over existing smart windows technology, namely polymer-dispersed liquid crystal (PDLC), suspended particle windows and electro-chromic windows. The electro-optical behaviors described herein can also be used for additional applications. Examples include: (1) privacy windows, where the infrared-reflecting fluid is also reflecting in the visible, thereby creating a haze that provides privacy (unlike PDLC, which is not stable enough for exterior applications, these privacy windows could be exterior-facing and could be used for conference rooms, hospital rooms, and other interior privacy situations, etc.); and (2) appliance windows including, e.g., a refrigerator door that becomes transparent without opening the door, but prevents heat from entering.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

To provide additional context for various aspects of the present invention, the following discussion is intended to provide a brief, general description of a suitable computing environment in which the various aspects of the invention may be implemented. While one embodiment of the invention relates to the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that aspects of the inventive methods may be practiced with other computer system configurations, including single-processor or multi-processor computer systems, minicomputers, mainframe computers, as well as personal computers, hand-held wireless computing devices, microprocessor-based or programmable consumer electronics, and the like, each of which can be operatively coupled to one or more associated devices. Aspects of the invention may also be practiced in distributed computing environments where certain tasks are performed by remote processing devices that are linked through a communications network. In a distributed computing environment, program modules may be located in both local and remote memory storage devices.

A computer may include a variety of computer readable media. Computer readable media may be any available media that can be accessed by the computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which may be used to store the desired information and which may be accessed by the computer.

An exemplary environment for implementing various aspects of the invention may include a computer that includes a processing unit, a system memory and a system bus. The system bus couples system components including, but not limited to, the system memory to the processing unit. The processing unit may be any of various commercially available processors. Dual microprocessors and other multi processor architectures may also be employed as the processing unit.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

The computer may further include an internal hard disk drive (HDD) (e.g., EIDE, SATA), which internal hard disk drive may also be configured for external use in a suitable chassis, a magnetic floppy disk drive (FDD), (e.g., to read from or write to a removable diskette) and an optical disk drive, (e.g., reading a CD-ROM disk or, to read from or write to other high capacity optical media such as the DVD). The hard disk drive, magnetic disk drive and optical disk drive may be connected to the system bus by a hard disk drive interface, a magnetic disk drive interface and an optical drive interface, respectively. The interface for external drive implementations includes at least one or both of Universal Serial Bus (USB) and IEEE 1394 interface technologies.

The drives and their associated computer-readable media may provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules may be stored in the drives and RAM, including an operating system, one or more application programs, other program modules and program data. All or portions of the operating system, applications, modules, and/or data may also be cached in the RAM. It is appreciated that the invention may be implemented with various commercially available operating systems or combinations of operating systems.

It is within the scope of the disclosure that a user may enter commands and information into the computer through one or more wired/wireless input devices, for example, a touch screen display, a keyboard and/or a pointing device, such as a mouse. Other input devices may include a microphone (functioning in association with appropriate language processing/recognition software as know to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the invention, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

Following from the above description and invention summaries, it should be apparent to those of ordinary skill in the art that, while the methods and apparatuses herein described constitute exemplary embodiments of the present invention, it is to be understood that the inventions contained herein are not limited to the above precise embodiment and that changes may be made without departing from the scope of the invention. Likewise, it is to be understood that it is not necessary to meet any or all of the identified advantages or objects of the invention disclosed herein in order to fall within the scope of the invention, since inherent and/or unforeseen advantages of the present invention may exist even though they may not have been explicitly discussed herein.

What is claimed is:

1. A window for adjusting a quantity of light in a visible spectrum and a quantity of light in a near infrared spectrum, the window comprising:
    an exterior layer;
    an interior layer; and
    an electrofluidic layer that is positioned between the exterior layer and the interior layer and operably coupled to the exterior layer, the electrofluidic layer configured to:
        transmit a portion of the light in the visible spectrum and reflect a portion of the light in the near infrared spectrum so that a greater quantity of light in the visible spectrum is transmitted as compared to the quantity of light in the near infrared spectrum when operating in a first selectable state, and transmit a portion of the light in the near infrared spectrum and reflect a portion of the light in the visible spectrum so that a greater quantity of light in the near infrared spectrum is transmitted as compared to the quantity of light in the visible spectrum when operating in a second selectable state as compared to the first selectable state.

2. The window of claim 1, further comprising:
    a plurality of channel electrodes positioned in the electrofluidic layer such that a voltage applied to the plurality of channel electrodes changes a fluid contact angle with the channel, thereby moving a fluid located in the electrofluidic layer into the channel and wherein the fluid determines, at least in part, a transmissive attribute of the electrofluidic layer.

3. The window of claim 1, wherein the window is further configured to absorb the portion of the light in the visible spectrum when operating in the second selectable state.

4. The window of claim 1, wherein the window is further configured to reflect at least 25% of the light in the near infrared spectrum when operating in the first selectable state.

5. The window of claim 1, wherein the window is further configured to minimize haze at or below 20% when operating in the first selectable state.

6. The window of claim 1 wherein the window is a component in a system comprising at least one additional component of an interior climate sensor monitoring an interior climate near an interior surface of the window, an exterior climate sensor monitoring an exterior climate near an exterior surface of the window, a timing circuit, and a microprocessor programmed with climate control algorithms, with said at least one additional component providing a controlling signal for selecting one of the selectable states.

7. The window of claim 1 further comprising a second electrofluidic layer operably coupled to the interior layer.

8. The window of claim 1 wherein the fluid comprises a pigmented fluid.

9. A window for adjusting a quantity of light in a visible spectrum and a quantity of light in a near infrared spectrum, the window comprising:
    an exterior layer;
    an interior layer; and
    an electrofluidic layer that is positioned between the exterior layer and the interior layer and operably coupled to the exterior layer, the electrofluidic layer configured to:
        transmit a substantially equal quantity of light in the visible spectrum and the near infrared spectrum when operating in a first selectable state, and transmit a greater quantity of light in the near infrared spectrum as compared to the quantity of the light transmitted in the visible spectrum when operating in a second selectable state as compared to the first selectable state.

10. The window of claim 9, wherein the window is further configured to minimize haze at less than or equal to 20% when operating in the first selectable state.

11. The window of claim 9, further comprising:
    a plurality of channel electrodes positioned in the electrofluidic layer such that a voltage applied to the plurality of channel electrodes changes a fluid contact angle with the channel, thereby moving a fluid located in the electrofluidic layer into the channel and wherein the fluid determines, at least in part, a transmissive attribute of the electrofluidic layer.

12. The window of claim 9, wherein the window is a component in a system comprising:
    at least one additional component of an interior climate sensor monitoring an interior climate near an interior surface of the window;
    an exterior climate sensor monitoring an exterior climate near an exterior surface of the window;
    a timing circuit; and
    a microprocessor programmed with climate control algorithms, with the at least one additional component providing a controlling signal for selecting one of the selectable states.

13. The window of claim 9, further comprising:
    a second electrofluidic layer operably coupled to the interior layer.

14. A window for adjusting a quantity of light in a visible spectrum and a quantity of light in a near infrared spectrum, the window comprising:
    an exterior layer;
    an interior layer;
    an electrofluidic layer that is positioned between the exterior layer and the interior layer and operably coupled to the exterior layer, the electrofluidic layer configured to:
        transmit a portion of the light in the visible spectrum and reflect a portion of the light in the near infrared spectrum so that a greater quantity of light in the visible spectrum is transmitted as compared to the quantity of light in the near infrared spectrum when operating in a first selectable state, and
        transmit a portion of the light in the near infrared spectrum and reflect a portion of the light in the visible spectrum so that a greater quantity of light in the near infrared spectrum is transmitted as compared to the quantity of light in the visible spectrum when operating in a second selectable state as compared to the first selectable state; and
    a plurality of channel electrodes positioned in the electrofluidic layer such that a voltage applied to the plurality of channel electrodes is configured to change a fluid contact angle with the channel, thereby moving a fluid located in the electrofluidic layer into the channel to determine a transmissive attribute of the electrofluidic layer.

* * * * *